(12) United States Patent
Kim et al.

(10) Patent No.: US 9,460,351 B2
(45) Date of Patent: Oct. 4, 2016

(54) IMAGE PROCESSING APPARATUS AND METHOD USING SMART GLASS

(71) Applicant: Electronics and Telecommunications Research Institute, Daejeon (KR)

(72) Inventors: Kwi Hoon Kim, Daejeon (KR); Woong Shik You, Gyeryong (KR); Jae Hwui Bae, Daejeon (KR); Sang Woo Ahn, Daejeon (KR); O Hyung Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 290 days.

(21) Appl. No.: 14/035,803

(22) Filed: Sep. 24, 2013

(65) Prior Publication Data
US 2014/0146178 A1    May 29, 2014

(30) Foreign Application Priority Data

Nov. 28, 2012   (KR) .................. 10-2012-0135912

(51) Int. Cl.
| | |
|---|---|
| *H04N 13/04* | (2006.01) |
| *G06K 9/00* | (2006.01) |
| *G06F 3/01* | (2006.01) |
| *G01S 17/02* | (2006.01) |
| *H04N 7/14* | (2006.01) |
| *G01B 11/02* | (2006.01) |
| *H04N 7/18* | (2006.01) |
| *G08B 13/196* | (2006.01) |
| *H04N 7/15* | (2006.01) |
| *G06F 3/14* | (2006.01) |
| *H04N 21/218* | (2011.01) |
| *H04N 21/2187* | (2011.01) |

(Continued)

(52) U.S. Cl.
CPC ......... *G06K 9/00771* (2013.01); *G01B 11/022* (2013.01); *G01S 17/023* (2013.01); *G06F 3/013* (2013.01); *G06F 3/017* (2013.01); *G06F 3/14* (2013.01); *G06K 9/00335* (2013.01); *G08B 13/19621* (2013.01); *H04N 7/144* (2013.01); *H04N 7/147* (2013.01); *H04N 7/15* (2013.01); *H04N 7/181* (2013.01); *H04N 21/2187* (2013.01); *H04N 21/21805* (2013.01); *H04N 21/4316* (2013.01); *H04N 21/2743* (2013.01); *H04N 2007/145* (2013.01)

(58) Field of Classification Search
CPC ................. H04N 7/181; H04N 7/147; H04N 2007/145; H04N 7/15; H04N 7/144; G08B 13/19621; G01S 17/023; G01B 11/022
See application file for complete search history.

(56) References Cited

U.S. PATENT DOCUMENTS

| | | | | |
|---|---|---|---|---|
| 2004/0175764 A1* | 9/2004 | Nishiyama | ................ | G06T 1/00 435/7.2 |
| 2009/0018926 A1* | 1/2009 | Buehlman | .............. | G06Q 30/02 705/26.81 |
| 2009/0116766 A1* | 5/2009 | Matsumoto | ........... | G06T 7/0044 382/311 |

(Continued)

FOREIGN PATENT DOCUMENTS

| | | |
|---|---|---|
| KR | 10-2010-0003414 A | 1/2010 |
| KR | 10-2010-0127027 A | 12/2010 |

*Primary Examiner* — Shawn An

(57) ABSTRACT

An image processing apparatus using a smart glass is provided, the image processing apparatus including an extractor to extract a first target to be observed by a user from a first image received from the smart glass and generate a second image using the extracted first target, an information collector to collect information related to the first target, and an image generator to reconstruct a third image using at least one of the second image and the information related to the first target, based on user settings.

19 Claims, 10 Drawing Sheets

(51) Int. Cl.
  *H04N 21/431* (2011.01)
  *H04N 21/2743* (2011.01)

(56) References Cited

U.S. PATENT DOCUMENTS

2012/0195363 A1* 8/2012 Laganiere ............... H04N 19/85
                                                        375/240.01
2013/0127980 A1* 5/2013 Haddick .................. G06F 3/013
                                                          348/14.08
2013/0229482 A1* 9/2013 Vilcovsky .............. H04N 7/144
                                                          348/14.07
2014/0139405 A1* 5/2014 Ribble .................. G06F 19/327
                                                              345/8
2014/0176565 A1* 6/2014 Adeyoola ............... G06T 13/80
                                                            345/473

* cited by examiner

(12) United States Patent

IMAGE PROCESSING APPARATUS AND METHOD USING SMART GLASS

CROSS-REFERENCE TO RELATED APPLICATION

This application claims the benefit of Korean Patent Application No. 10-2012-0135912, filed on Nov. 28, 2012, in the Korean Intellectual Property Office, the disclosure of which is incorporated herein by reference.

BACKGROUND

1. Field of the Invention

The present invention relates to technologies using a smart glass or a smart device, and more particularly, to an apparatus and method that may recognize an image using a smart glass or a smart device, and reconstruct and represent an image suitable for a predetermined purpose.

2. Description of the Related Art

Television (TV) and device technologies are developing quickly by reflecting needs of multimedia consumers. In particular, TV technologies have developed from a conventional analog TV system to a standard definition television (SDTV) and a high definition television (HDTV), and further to a digital television (DTV). In addition, with the development of the HDTV, new devices such as a media medium, for example, Blu-ray Disc (BD), that provides a high-quality image, a media player, for example, a BD player, that plays back the provided image, and the like have been introduced.

Recently, an Internet function has been provided in a TV. Accordingly, users may utilize multimedia and multicast through a TV. Such a function may be implemented through an electronic program guide (EPG) service.

With a rapid propagation of the Internet, a remote monitoring service using a network camera has been available. A remote monitoring system may include a network camera to transmit an image, and main management equipment to receive an image and control the network camera. The network camera may transmit a captured image to the main management equipment over a network, and the main management equipment may manage an initiation and a termination of image transmission from each of a plurality of network cameras, receive a transmitted image during the image transmission, and provide the image to a user so that the user may check the provided image.

However, there is a demand for a method of controlling a target to be monitored by a remote manager accurately and minutely, and controlling a camera device more conveniently, in contrast to conventional remote image transmission.

SUMMARY

According to an aspect of the present invention, there is provided an image processing apparatus using a smart glass, the apparatus including an extractor to extract a first target to be observed by a user from a first image received from the smart glass and generate a second image using the extracted first target, an information collector to collect information related to the first target, and an image generator to reconstruct a third image using at least one of the second image and the information related to the first target, based on user settings.

The first target may include at least one of a time interval, a motion, a sound, an event, an object, and a predetermined person to be observed by the user.

The first image may be captured from a viewpoint corresponding to a gaze of the user.

The second image in which an image quality with respect to a portion corresponding to the first target is greater than or equal to a first resolution, and an image quality with respect to a remaining portion excluding the first target is less than the first resolution, may be generated.

The extractor may include a motion recognizer to recognize a predetermined motion of the user, and the extractor may provide the user with information related to the predetermined motion of the user.

The image generator may include a comparator to compare a previous image associated with the first target to the third image and provide a result of the comparing.

The image generator may recommend an image for each category of the information related to the first target, based on the information related to the first target.

The third image may include additional information provided using at least one of a graphic and a character.

The smart glass may include a depth camera or a 360-degree view angle camera, and may be connected to the Internet.

According to another aspect of the present invention, there is also provided an image processing method using a smart glass, the method including receiving a first image from the smart glass, and extracting a first target to be observed by a user from the first image, generating a second image using the extracted first image, collecting information related to the first target, and reconstructing a third image using at least one of the second image and the information related to the first target, based on user settings.

The first target may include at least one of a time interval, a motion, a sound, an event, an object, and a predetermined person to be observed by the user.

The first image may be captured from a viewpoint corresponding to a gaze of the user.

The second image in which an image quality with respect to a portion corresponding to the first target is greater than or equal to a first resolution, and an image quality with respect to a remaining portion excluding the first target is less than the first resolution, may be generated.

According to still another aspect of the present invention, there is also provided an image processing method using a smart glass, the method including extracting a first target to be observed by a user from a first image received from the smart glass and generating a second image using the extracted first target, collecting information related to the first target, and reconstructing a third image using at least one of the second image and the information related to the first target, based on user settings, and comparing a previous image associated with the first target to the third image and providing a result of the comparing on one side of the third image.

According to yet another aspect of the present invention, there is also provided an image processing method using a smart glass, the method including extracting a first target to be observed by a user from a first image received from the smart glass and generating a second image using the extracted first target, collecting information related to the first target, and reconstructing a third image using at least one of the second image and the information related to the first target, based on user settings, and providing a recommended image for each category of the information related to the first target on one side of the third image.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
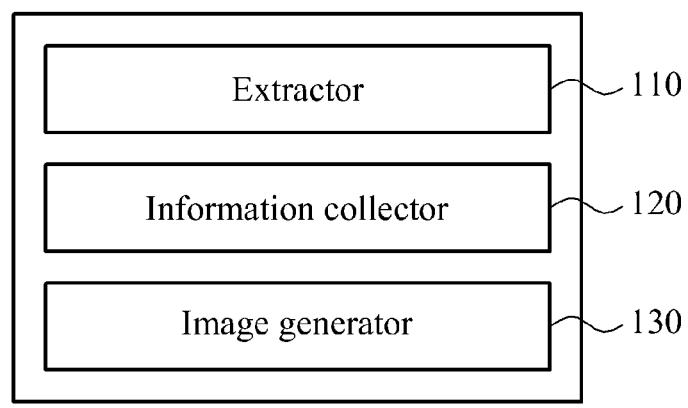
FIG. 1 is a block diagram illustrating an image processing apparatus using a smart glass according to an embodiment.

Reference will now be made in detail to exemplary embodiments of the present invention with reference to the accompanying drawings. However, the present invention is not limited to the exemplary embodiments. In the accompanying drawings, like reference numerals refer to the like elements throughout.

The terms used herein are mainly selected from general terms currently being used in light of functions in the present invention. Yet, the meanings of the terms used herein may be changed to keep up with the intent of an operator in the art, a custom, or the appearance of new technologies.

In addition, in a specific case, most appropriate terms are arbitrarily selected by the applicant for ease of description and/or for ease of understanding. In this instance, the meanings of the arbitrarily used terms will be clearly explained in the corresponding description. Hence, the terms should be understood not by the simple names of the terms but by the meanings of the terms and the following overall description of this specification.

Herein, the term "first image" refers to an image including a predetermined target to be observed by a user, among images received from a smart glass.

The term "first target" refers to a predetermined target to be observed by a user, and may include a predetermined person, but not limited thereto, and various targets to be recognized, for example, a predetermined building, object, place, and the like.

The term "second image" refers to an image generated by recognizing a first target in a first image received from a smart glass, and extracting the first target from the first image.

The term "third image" refers to an image reconstructed based on user settings in relation to a first target, and may be configured using various schemes depending on an embodiment.

The term "first resolution" refers to a threshold value being a focusing reference with respect to a first target, and may be applied to a portion corresponding to the first target for efficient transmission of a second image or a third image.

FIG. 1 is a block diagram illustrating an image processing apparatus 100 using a smart glass according to an embodiment.

Referring to FIG. 1, the image processing apparatus 100 may include an extractor 110, an information collector 120, and an image generator 130.

The extractor 110 may extract a first target to be observed by a user from a first image received from a smart glass, and generate a second image using the extracted first target.

The first image refers to an image including a predetermined target to be observed by the user, among a plurality of images received from the smart glass, and may include an image captured from a viewpoint corresponding to a gaze of the user.

The first target refers to a predetermined target to be observed by the user, and may include at least one of a time interval, a motion, a sound, an event, an object, and a predetermined person.

The second image refers to an image generated by recognizing the first target in the first image and extracting the first target from the first image. In the generated second image, an image quality with respect to a portion corresponding to the first target may be greater than or equal to a first resolution, and an image quality with respect to a remaining portion excluding the first target may be less than the first resolution.

The first resolution may be construed as a threshold value being a focusing reference with respect to the first target, and may be applied to a portion corresponding to the first target for efficient transmission of the second image or a third image.

The extractor 110 may include a motion recognizer (not shown) to recognize a predetermined motion of the user. The extractor 110 may provide the user with information related to the predetermined motion of the user.

The information collector 120 may collect information related to the first target.

The information related to the first target may include static information, for example, basic profile information with respect to the first target, and dynamic information obtained through a real-time information search.

The image generator 130 may reconstruct a third image using at least one of the second image and the information related to the first target, based on user settings.

The image generator 130 may include a comparator (not shown) to compare a previous image associated with the first target to the third image, and provide a result of the comparing.

The image generator 130 may recommend an image for each category of the information related to the first target, based on the information related to the first target, and provide the recommended image along with the third image. The image for each category of the information related to the first target may be provided to be included on one side of the third image.

The third image refers to an image reconstructed based on user settings in relation to the first target, and may be configured using various schemes depending on an embodiment.

In addition, the third image may include additional information provided using at least one of a graphic and a character.

The smart glass may include a device capable of acquiring an image of various angles from a viewpoint corresponding to a gaze of the user, for example, a depth camera or a 360-degree view angle camera. The smart glass may be applied to a commonly used camera device, eyeglasses, a mirror, a window, and the like.

Figure 2:
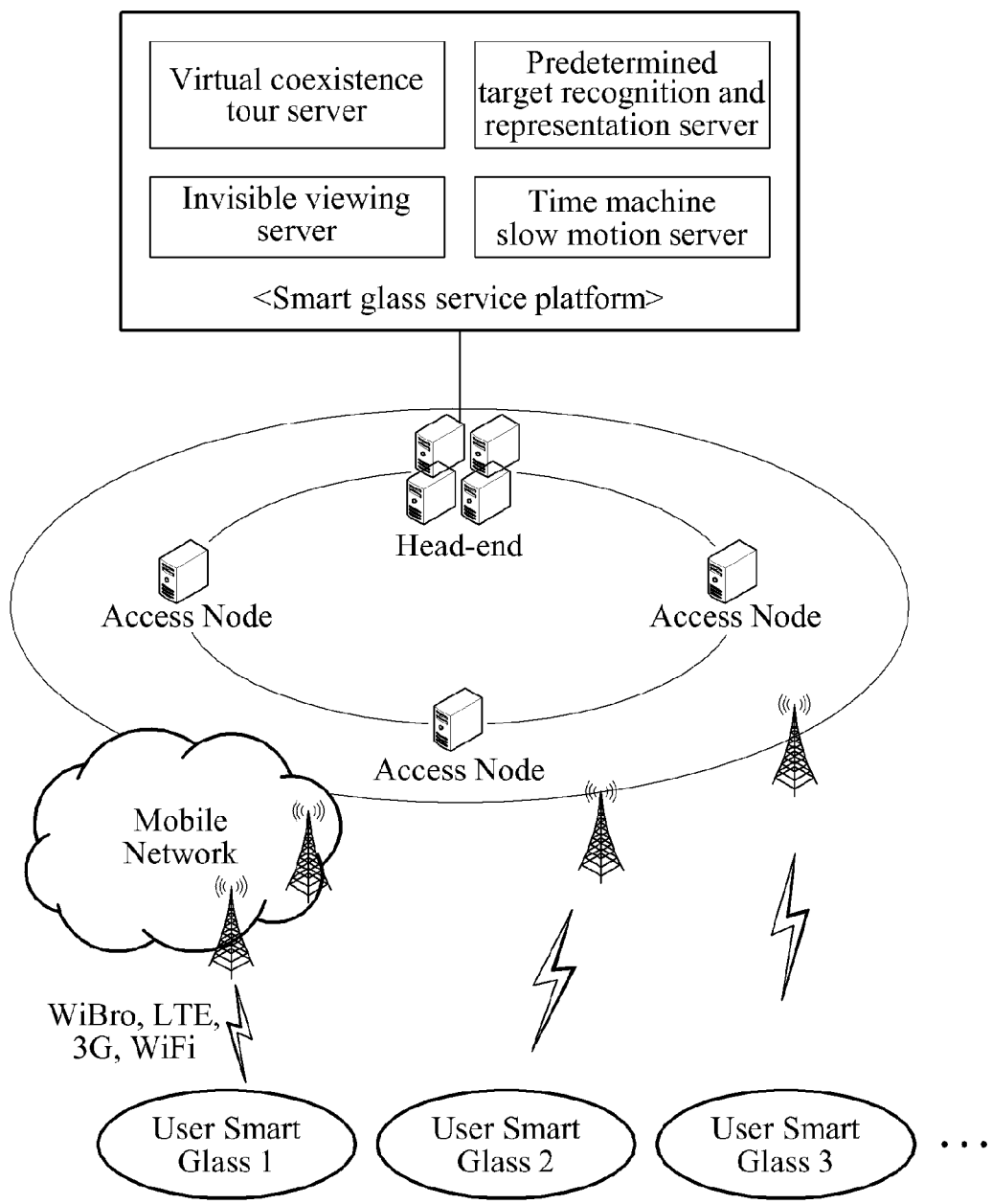
FIG. 2 is a diagram illustrating services using a smart glass according to an embodiment.

FIG. 2 is a diagram illustrating services using a smart glass according to an embodiment.

Referring to FIG. 2, when a user wears a smart glass, or a smart device including a smart glass, the user may be provided with various types of services using a smart glass according to embodiments through communication with a smart glass service platform.

The image processing apparatus 100 of FIG. 1 may be implemented on the smart glass service platform, and implemented using various schemes, for example, a virtual coexistence tour server, a predetermined target recognition and representation server, an invisible viewing server, a time machine slow motion server, and the like, depending on service contents.

Various types of service contents using a smart glass will be further described with reference to FIGS. 3 through 9.

The smart glass of the user may be applied to a commonly used camera device, see-through or see-closed eyeglasses, a mirror, a window, and the like, and may include a device capable of acquiring an image of various angles from a viewpoint corresponding to a gaze of the user, for example, a depth camera, or a 360-degree view angle camera.

The smart glass of the user may exchange various images and information by communicating with a smart glass of another user in a remote place, depending on service contents.

According to the present embodiment, the smart glass service platform may be provided in a cloud format, and may be configured to include various service servers, for example, a virtual coexistence tour server, a predetermined target recognition and representation server, an invisible viewing server, a time machine slow motion server, and the like.

Figure 3:
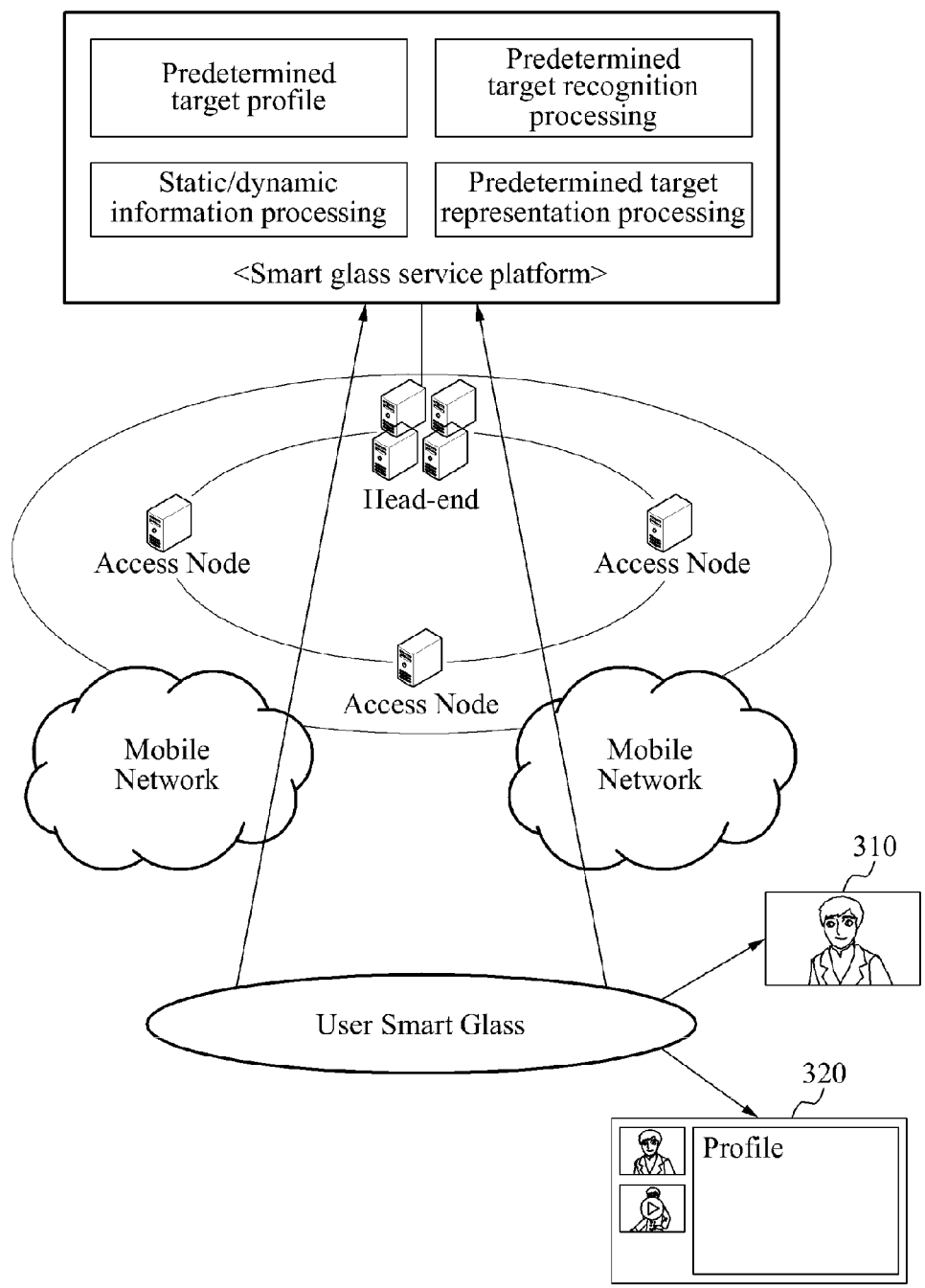
FIG. 3 is a diagram illustrating a predetermined target recognition and representation function using a smart glass according to an embodiment.

FIG. 3 is a diagram illustrating a predetermined target recognition and representation function using a smart glass according to an embodiment.

The image processing apparatus 100 of FIG. 1 may be implemented on a smart glass service platform to provide a predetermined target recognition and representation service.

The extractor 110 may receive a first image 310 from a smart glass of a user. The extractor 110 may extract a first target to be observed by the user from the first image 310, and generate a second image using the extracted first target.

When information related to the first target is collected by the information collector 120, the image generator 130 may reconstruct a third image 320 using at least one of the second image and the information related to the first target.

The predetermined target recognition and representation service may recognize a celebrity or a target previously viewed through the smart glass, and provide relevant information to the user.

A predetermined target, for example, the first target, may include at least one of a predetermined person, for example, a celebrity or a person previously viewed, a predetermined building, a place, an object, an event, a sound, a motion, and a time interval.

The first target is not limited to a single first target. Image processing may be performed with respect to a plurality of first targets.

The information related to the first target may include static information, for example, basic profile information with respect to the first target, and dynamic information obtained through a real-time information search.

Figure 4:
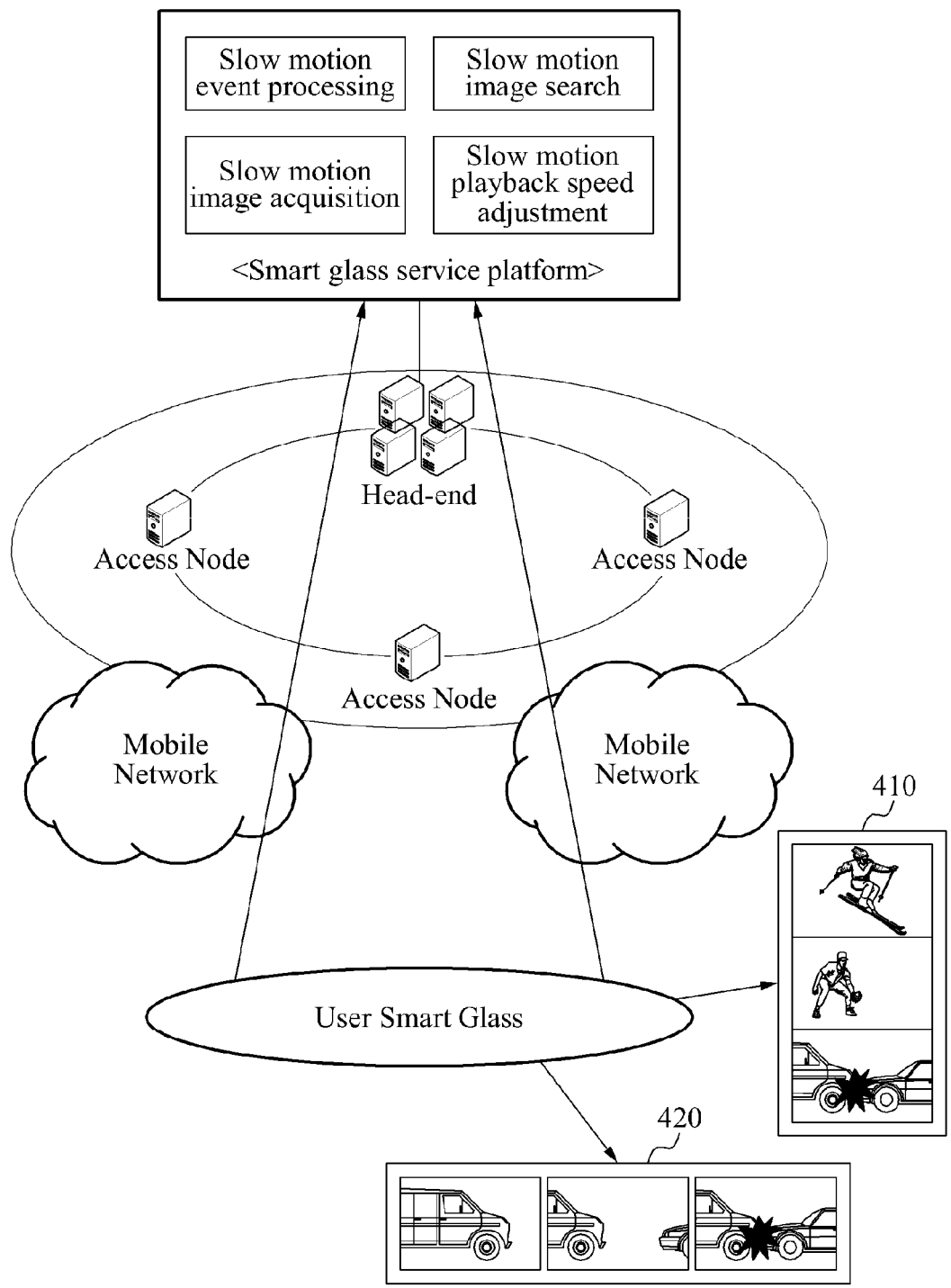
FIG. 4 is a diagram illustrating a time machine slow motion function using a smart glass according to an embodiment.

FIG. 4 is a diagram illustrating a time machine slow motion function using a smart glass according to an embodiment.

The image processing apparatus 100 of FIG. 1 may be implemented on a smart glass service platform to provide a time machine slow motion service.

The time machine slow motion service may replay a scene having passed quickly in a perimeter of the user, slowly and minutely in a slow motion.

The extractor 110 may receive a first image 410 with respect to an automobile accident or a sports game scene from a smart glass of a user, extract a first target to be observed by the user from the first image 410, and generate a second image using the extracted first target.

In the time machine slow motion service, the first target may be set to be at least one of a sound, an event, and a predetermined time interval with respect to the first image.

When information related to the first target is collected by the information collector 120, the image generator 130 may reconstruct a third image 420 using at least one of the second image and the information related to the first target.

The user may be provided with the time machine slow motion service, by acquiring the reconstructed third image 420 in a time machine slow motion, for example, through playback speed adjustment, in relation to the first target to be re-observed, in the first image 410 acquired from the smart glass.

The third image 420 may be generated to include an automatic generation and indexing function with respect to a predetermined event desired by the user or a start event of the slow motion using sound recognition.

Figure 5:
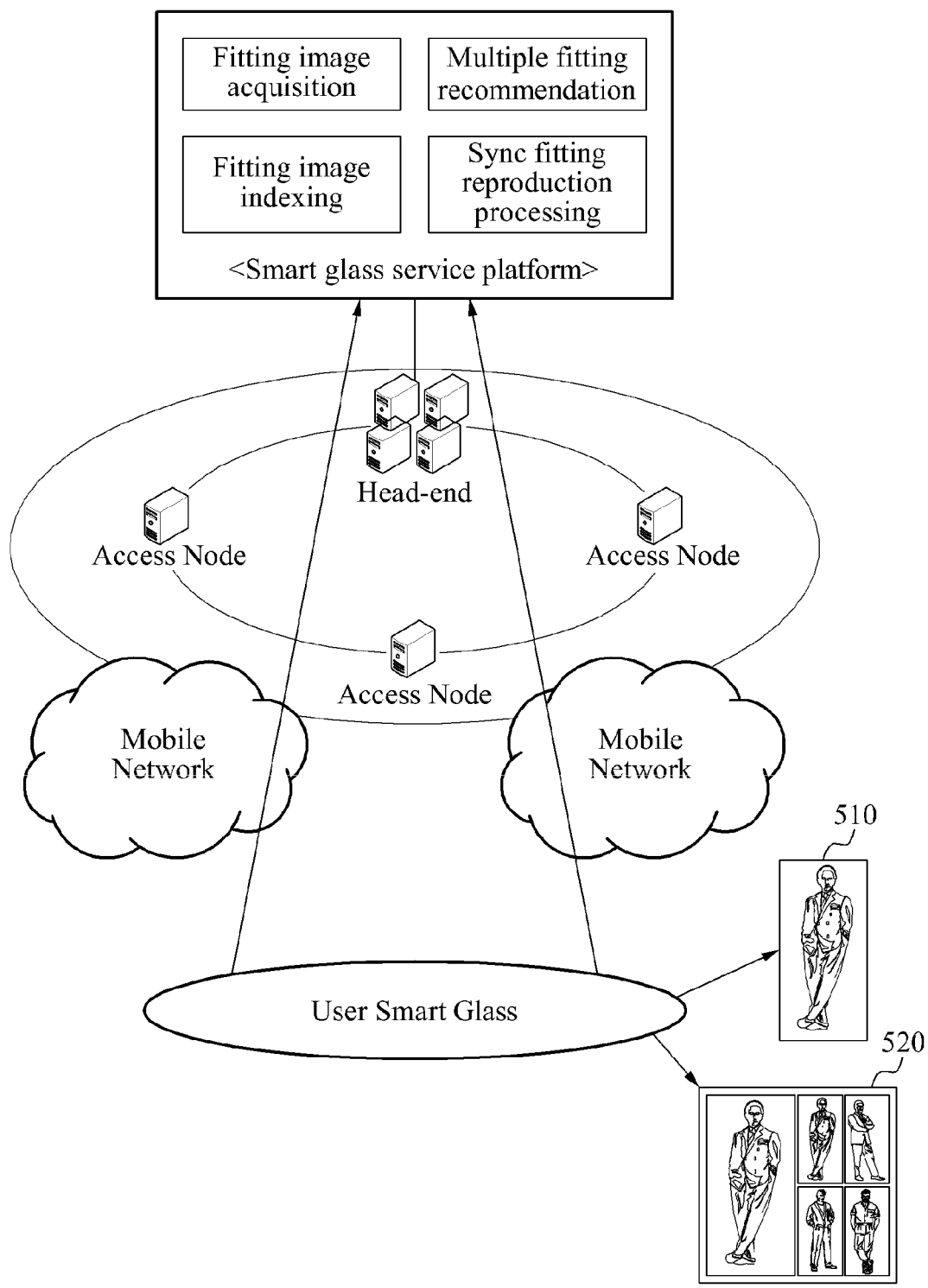
FIG. 5 is a diagram illustrating a synchronized multiple fitting function using a smart glass according to an embodiment.

FIG. 5 is a diagram illustrating a synchronized multiple fitting function using a smart glass according to an embodiment.

The image processing apparatus 100 of FIG. 1 may be implemented on a smart glass service platform to provide a synchronized multiple fitting service.

The extractor 110 may receive a first image 510 from a smart glass of a user, extract a first target to be observed by the user from the first image 510, and generate a second image using the extracted first target.

When information related to the first target is collected by the information collector 120, the image generator 130 may reconstruct a third image 520 using at least one of the second image and the information related to the first target.

The synchronized multiple fitting service may enable the user to scan a list of clothes currently owned by the user through a mirror including a smart glass, and provide the user with relevant information.

The first target may be set to be a current appearance of the user, or the list of owned clothes. The first target may also be set to be a list of recommendations or a previous image corresponding to a current season or weather information.

The image generator 130 may provide the user with fitting images moving in identical patterns for the user to compare an appearance in current clothes to an appearance in other clothes through the mirror including the smart glass.

The image generator 130 may recommend an image for each category of the information related to the first target, based on the information related to the first target, and provide the recommended image along with the third image 520. In this example, the image for each category of the information related to the first target may be included on one side of the third image 520.

Figure 6:
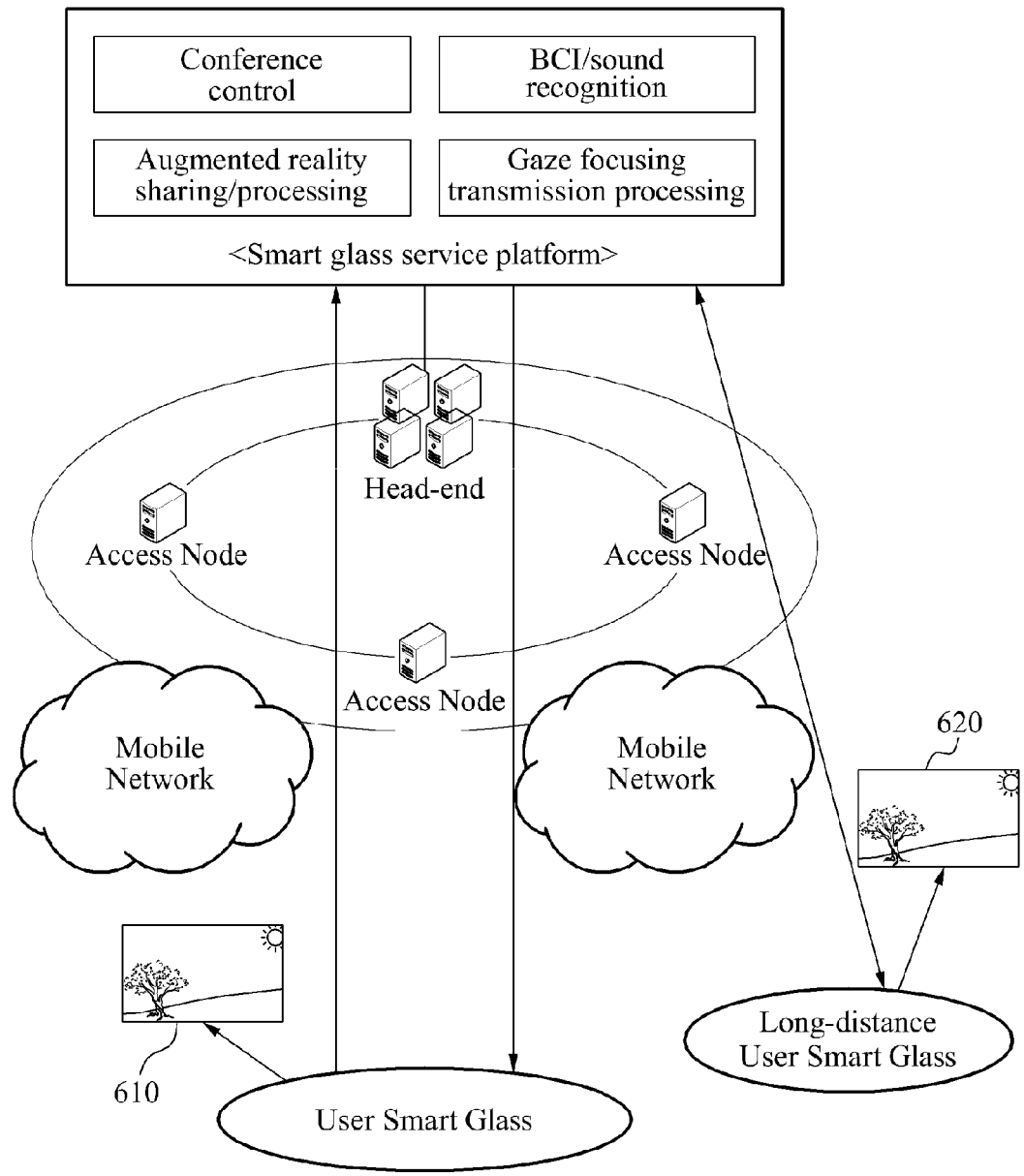
FIG. 6 is a diagram illustrating a virtual coexistence remote tour function using a smart glass according to an embodiment.

FIG. 6 is a diagram illustrating a virtual coexistence remote tour function using a smart glass according to an embodiment.

The image processing apparatus 100 of FIG. 1 may be implemented on a smart glass service platform to provide a virtual coexistence remote tour service.

The virtual coexistence remote tour service may enable an image captured using a smart glass in a remote place, for example, a second place, to be viewed identically in a current place, for example, a first place, and may provide a user in the first place with an effect similar to being in the remote place, for example, the second place.

The extractor 110 may receive a first image 610 from a smart glass of a user, extract a first target to be observed by the user from the first image 610, and generate a second image using the extracted first target.

In the virtual coexistence remote tour service, the first image refers to an image captured from a viewpoint corresponding to a gaze of the user with respect to the remote place, for example, the second place, and the first target may include a predetermined scene or a landscape of the remote place.

The second image refers to an image generated by recognizing the first target in the first image 610 and extracting the first target from the first image 610. In the second image, an image quality with respect to a portion corresponding to the first target may be greater than or equal to a first resolution, and an image quality with respect to a remaining portion excluding the first target may be less than the first resolution.

The first resolution may be construed as a threshold value being a focusing reference with respect to the first target, and may be applied to the portion corresponding to the first target for efficient transmission of the second image or a third image 620.

When information related to the first target is collected by the information collector 120, the image generator 130 may reconstruct the third image 620 using at least one of the second image and the information related to the first target.

For an augmented reality sharing function between user smart glasses of the first place and the second place, the third image 620 may represent a facial expression or a motion using a character for each user, or provide additional information, for example, a speech bubble, a navigation map using a graphic, and the like.

Figure 7:
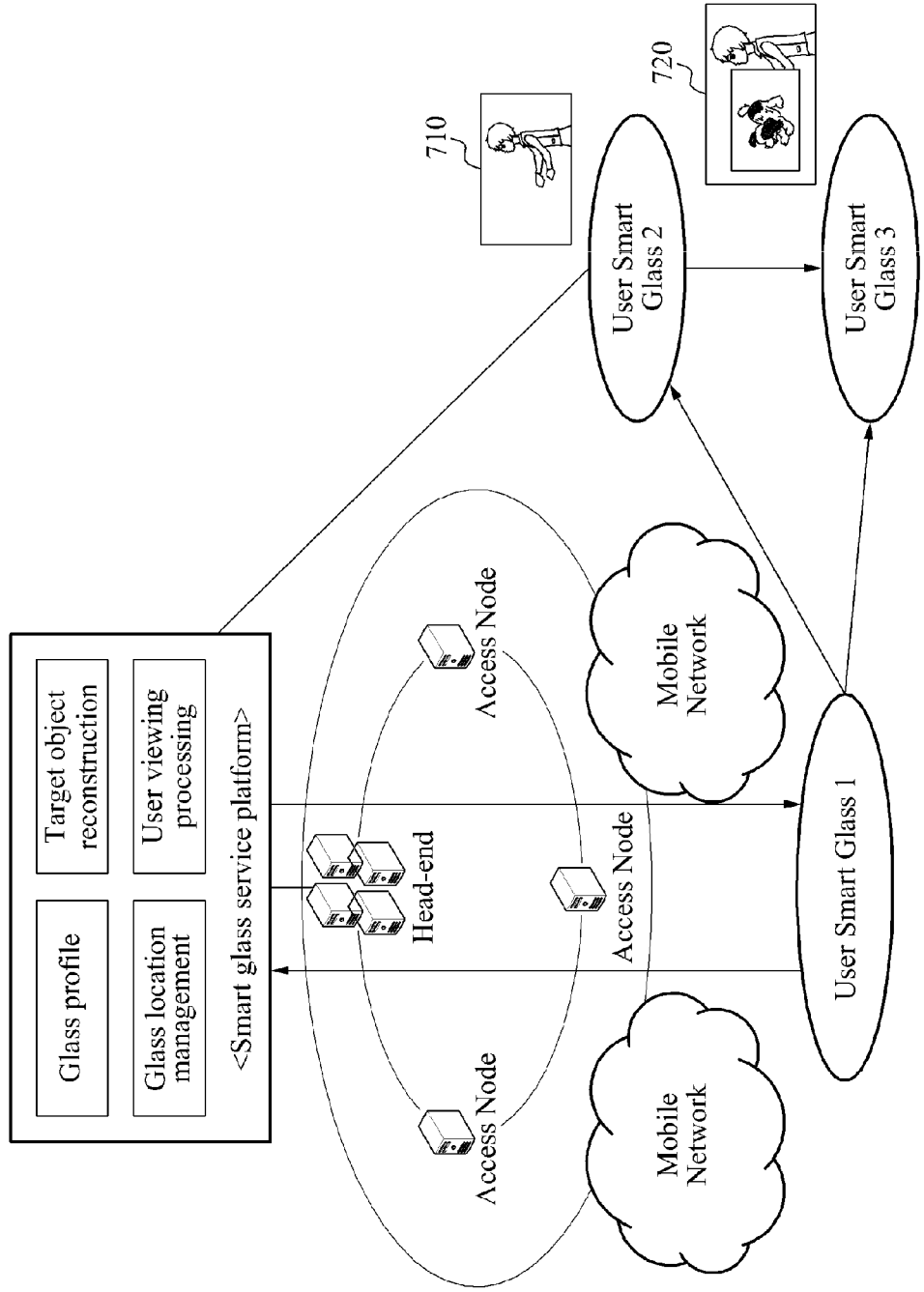
FIG. 7 is a diagram illustrating an invisible viewing function using a smart glass according to an embodiment.
Figure 8:
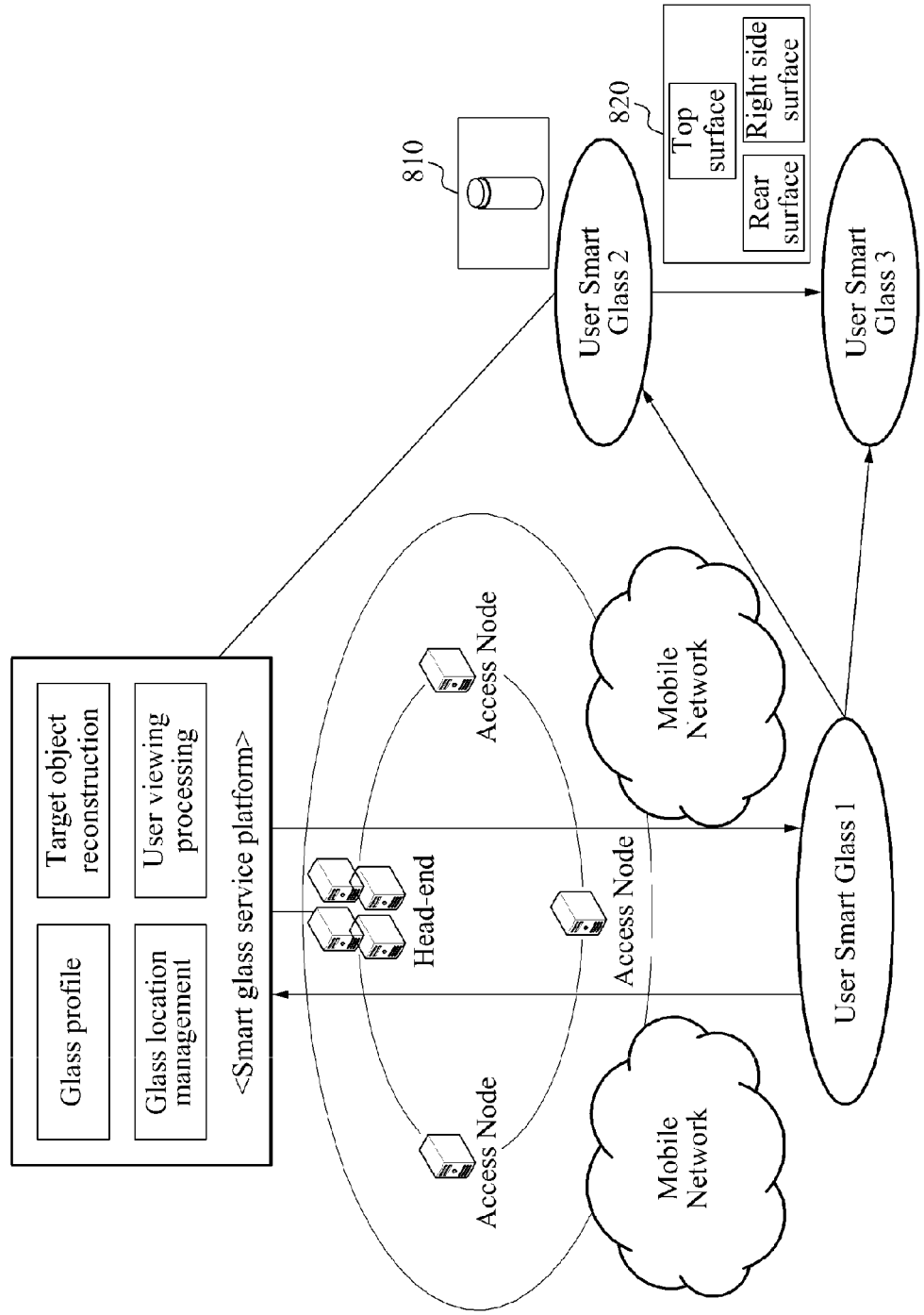
FIG. 8 is a diagram illustrating an invisible viewing function using a smart glass according to another embodiment.
Figure 9:
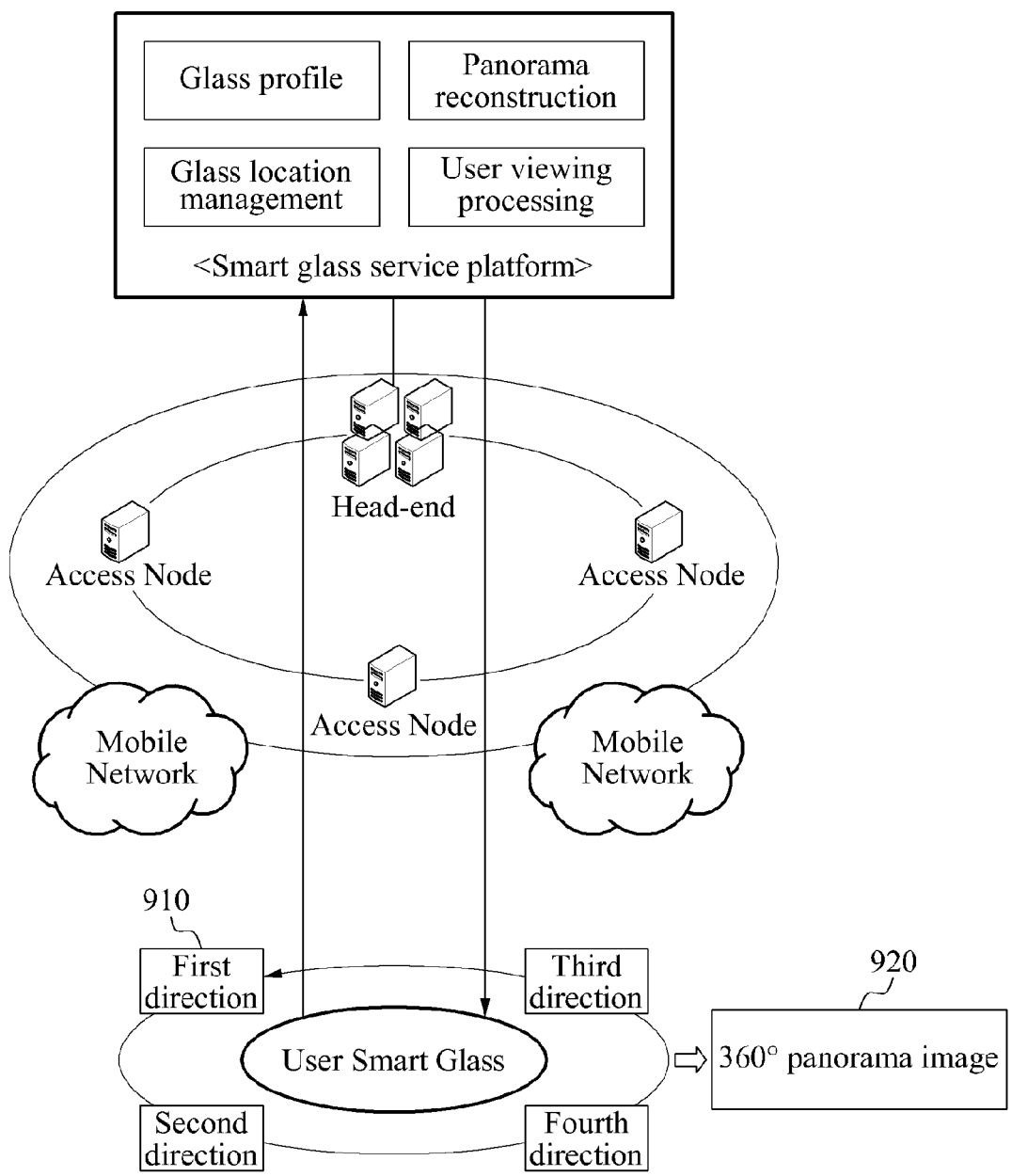
FIG. 9 is a diagram illustrating an invisible viewing function using a smart glass according to still another embodiment.

FIGS. 7 through 9 are diagrams illustrating invisible viewing functions using a smart glass according to embodiments.

The image processing apparatus 100 of FIG. 1 may be implemented on a smart glass service platform to provide invisible viewing services.

The invisible viewing services using a smart glass may provide images viewed from various viewpoints with respect to a predetermined target so that images invisible from viewpoints in an ordinary manner may be viewed using a plurality of smart glasses or cameras.

FIG. 7 is a diagram illustrating a function to represent an object on an opposite side of a blocked barrier, among the invisible viewing functions using a smart glass, according to an embodiment.

The extractor 110 may extract a first target to be observed by a user from a first image 710 acquired from a first user smart glass, and generate a second image using the extracted first target, and the information collector 120 may collect information related to the first target.

The information related to the first target may correspond to an image acquired from another direction by another user capturing the first target using a second user smart glass.

The image generator 130 may reconstruct a third image 720 using at least one of the second image and the information related to the first target, and the reconstructed third image 720 may be provided to a third user smart glass.

Image synthesis processing and object representation may be performed with respect to the third image 720 so that a viewpoint of the third image 720 may correspond to a viewpoint of the user.

In FIG. 7, a viewpoint obscured by a person in the first image 710 may be displayed on a separate pop-up window, and provided along with the third image 720 in a manner in which a barrier may be represented translucently and an object on an opposite side of the barrier may be represented clearly.

For example, in a school, a blackboard obscured by a tall student sitting in front or a teacher may be viewed. In a meeting, a mock-up product may be viewed from a side or an opposite direction, in addition to a direction of a user. A scene with respect to a direction which is narrowly viewed in general may be observed.

FIG. 8 is a diagram illustrating a function to represent a 360-degree viewing, for example, an invisible part, of an object, among invisible viewing functions using a smart glass, according to another embodiment.

The extractor 110 may extract a first target to be observed by a user from a first image 810 acquired from a first user smart glass, and generate a second image using the extracted first target, and the information collector 120 may collect information related to the first target.

The information related to the first target may correspond to an image acquired from another direction by another user capturing the first target using a second user smart glass or a third user smart glass.

The image generator 130 may reconstruct a third image 820 using at least one of the second image and the information related to the first target, based on user settings, and the third image 820 may be provided to the first user smart glass, the second user smart glass, and the third user smart glass.

In FIG. 8, with respect to an object, for example, the first target, in the first image 810, invisible parts, for example, a side surface, a rear surface, an internal portion, and the like, of the object may be represented and provided along with the third image 820, based on settings for each user.

When representation of the first target is possible in a virtual reality, the first target may be represented in the third image 820 using pre-generated information.

FIG. 9 is a diagram illustrating a function to represent a user-centric 360-degree panorama, among invisible viewing functions using a smart glass, according to still another embodiment.

The extractor 110 may receive a first image 910 from a user smart glass, extract a first target to be observed by the user from the first image 910, and generate a second image using the extracted first target.

The first image 910 may correspond to an image with respect to 360-degree directions based on the user, and the first target may include a predetermined scene or a landscape with respect to the 360-degree directions based on the user.

The extractor 110 may acquire four first images 910 with respect to a first direction, a second direction, a third direction, and a fourth direction when a view angle of the user smart glass corresponds to 90 degrees, and may acquire three first images 910 with respect to a first direction, a second direction, and a third direction when the view angle of the user smart glass corresponds to 120 degrees.

When information related to the first target is collected by the information collector 120, the image generator 130 may reconstruct a third image 920 using at least one of the second image and the information related to the first target.

In FIG. 9, with respect to the first image 910 including four images with respect to a first direction through a fourth direction of 360-degree directions based on the user, a panorama image may be reconstructed to have a viewpoint corresponding to a viewpoint of the user, and provided along with the third image 920.

Figure 10:
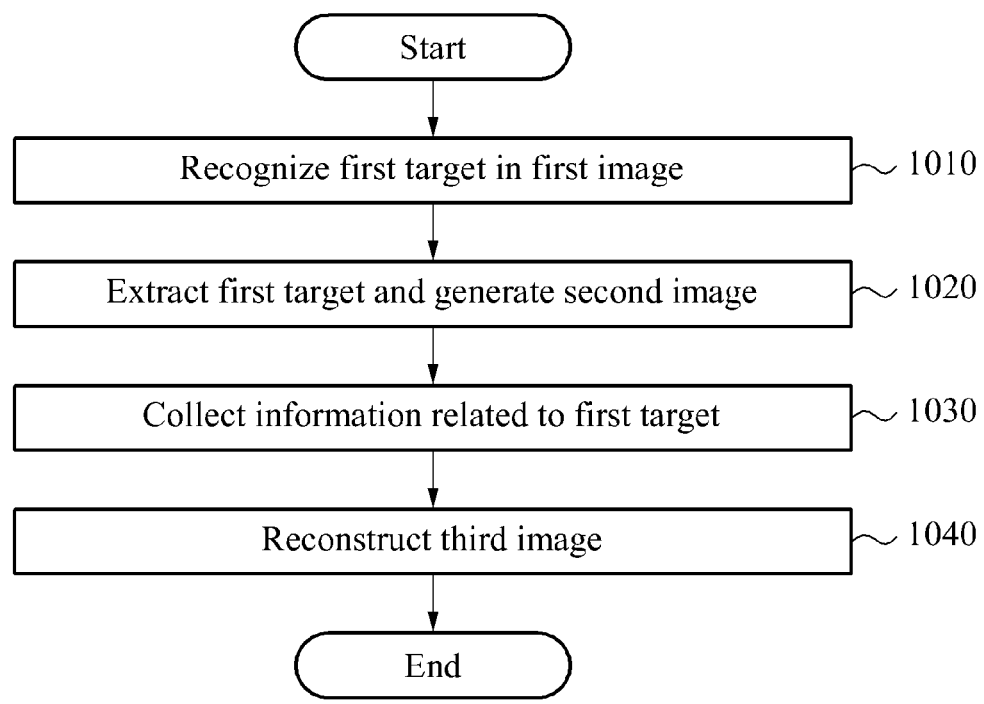
FIG. 10 is a flowchart illustrating an image processing method using a smart glass according to an embodiment.

FIG. 10 is a flowchart illustrating an image processing method using a smart glass according to an embodiment. The image processing method may be performed by the image processing apparatus 100 of FIG. 1.

In operation 1010, a first image may be received from a smart glass, and a first target to be observed by a user may be extracted from the first image.

The first image refers to an image including a predetermined target to be observed by a user, among a plurality of images received from the smart glass, and may include an image captured from a viewpoint corresponding to a gaze of the user.

The first target refers to a predetermined target to be observed by the user, and may include at least one of a time interval, a motion, a sound, an event, an object, and a predetermined person.

In operation 1020, a second image may be generated using the extracted first target.

The second image refers to an image generated by recognizing the first target in the first image and extracting the first target from the first image. In the generated second image, an image quality with respect to a portion corresponding to the first target may be greater than or equal to a first resolution, and an image quality with respect to a remaining portion excluding the first target may be less than the first resolution.

The first resolution may be construed as a threshold value being a focusing reference with respect to the first target, and may be applied to a portion corresponding to the first target for efficient transmission of the second image or a third image.

In operation 1020, a predetermined motion of the user may be recognized, and information related to the predetermined motion of the user may be provided to the user.

In operation 1030, information related to the first target may be collected.

The information related to the first target may include static information, for example, basic profile information with respect to the first target, and dynamic information obtained through a real-time information search.

In operation 1040, a third image may be reconstructed using at least one of the second image and the information related to the first target, based on user settings.

The third image refers to an image reconstructed based on user settings in relation to the first target, and may be configured using various schemes depending on an embodiment.

In addition, the third image may include additional information provided using at least one of a graphic and a character.

The smart glass may include a device capable of acquiring an image of various angles corresponding to a gaze of the user, for example, a depth camera or a 360-degree view angle camera. The smart glass may be applied to a commonly used camera device, eyeglasses, a mirror, a window, and the like.

According to another embodiment, the image processing method may employ a scheme of comparing a previous image associated with the first target to the third image.

In this embodiment, a first target to be observed by the user may be extracted from a first image received from a smart glass, and a second image may be generated using the extracted first target.

Information related to the first target may be collected.

A third image may be reconstructed using at least one of the second image and the information related to the first target, based on user settings. A previous image associated with the first target may be compared to the third image, and a result of the comparing may be provided on one side of the third image.

According to still other embodiment, the image processing method may employ a scheme of recommending a relevant image, based on the information related to the first target.

In this embodiment, a first target to be observed by the user may be extracted from a first image received from a smart glass, and a second image may be generated using the extracted first target.

Information related to the first target may be collected.

A third image may be reconstructed using at least one of the second image and the information related to the first target, based on user settings. A recommended image for each category of the information related to the first target may be provided on one side of the third image.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more non-transitory computer readable recording mediums.

The method according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An image processing apparatus using a smart glass, the apparatus comprising:
    an extractor to extract a first target to be observed by a user from a first image received from the smart glass and generate a second image using the extracted first target;
    an information collector to collect information related to the first target; and
    an image generator to generate a third image using at least one of the second image and the information related to the first target, based on user settings in relation to the first target,
    wherein, when the apparatus provides a time machine slow motion service to replay a scene having passed quickly in a perimeter of the user in a slow motion, the first target includes at least one of a sound, an event, and a predetermined time interval with respect to the first image, and the third image is a reconstructed image in a time machine slow motion and includes an automatic generation and indexing function with respect to a predetermined event desired by the user or a start event of the slow motion using sound recognition.

2. The apparatus of claim 1, wherein the first target further comprises at least one of a motion, an object, and a predetermined person to be observed by the user.

3. The apparatus of claim 1, wherein the first image is captured from a viewpoint corresponding to a gaze of the user.

4. The apparatus of claim 1, wherein the second image in which an image quality with respect to a portion corresponding to the first target is greater than or equal to a first resolution, and an image quality with respect to a remaining portion excluding the first target is less than the first resolution, is generated.

5. The apparatus of claim 1, wherein the extractor comprises:
    a motion recognizer to recognize a predetermined motion of the user,
    wherein the extractor provides the user with information related to the predetermined motion of the user.

6. The apparatus of claim 1, wherein the image generator comprises:
    a comparator to compare a previous image associated with the first target to the third image and provide a result of the comparing.

7. The apparatus of claim 1, wherein the image generator recommends an image for each category of the information related to the first target, based on the information related to the first target.

8. The apparatus of claim 1, wherein the third image comprises additional information provided using at least one of a graphic and a character.

9. The apparatus of claim 1, wherein the smart glass comprises a depth camera or a 360-degree view angle camera, and is connected to the Internet.

10. The apparatus of claim 1, wherein, when the apparatus further provides a synchronized multiple fitting service to enable the user to scan a list of clothes currently owned by the user through a mirror including the smart glass and to provide the user with information relating to the clothes, the first target includes at least one of a current appearance of the user, the list of clothes, a list of recommendations, and a previous image corresponding to a current season or weather information, and
    wherein the image generator provides the user with fitting images moving in identical patterns for the user to compare an appearance in current clothes to an appearance in other clothes through the mirror, recommends an image for each category of the information related to the first target, and provides the user with the recommended image along with the third image.

11. An image processing method using a smart glass, the method comprising:
    receiving a first image from the smart glass, and extracting a first target to be observed by a user from the first image;
    generating a second image using the extracted first image;
    collecting information related to the first target; and
    generating a third image using at least one of the second image and the information related to the first target, based on user settings in relation to the first target,
    wherein, when the method provides a time machine slow motion service to replay a scene having passed quickly in a perimeter of the user in a slow motion, the first target includes at least one of a sound, an event, and a predetermined time interval with respect to the first image, and the third image is a reconstructed image in a time machine slow motion and includes an automatic generation and indexing function with respect to a predetermined event desired by the user or a start event of the slow motion using sound recognition.

12. The method of claim 11, wherein the first target further comprises at least one of a motion, an object, and a predetermined person to be observed by the user.

13. The method of claim 11, wherein the first image is captured from a viewpoint corresponding to a gaze of the user.

14. The method of claim 11, wherein the second image in which an image quality with respect to a portion corresponding to the first target is greater than or equal to a first resolution, and an image quality with respect to a remaining portion excluding the first target is less than the first resolution, is generated.

15. The method of claim 11, further comprising:
comparing a previous image associated with the first target to the third image and providing a result of the comparing on one side of the third image.

16. The method of claim 11, further comprising:
providing a recommended image for each category of the information related to the first target on one side of the third image.

17. The method of claim 11, wherein, when the method further provides a synchronized multiple fitting service, the method further comprises:
enabling the user to scan a list of clothes currently owned by the user through a mirror including the smart glass;
providing the user with information relating to the clothes;
providing the user with fitting images moving in identical patterns for the user to compare an appearance in current clothes to an appearance in other clothes through the mirror;
recommending an image for each category of the information related to the first target; and
providing the user with the recommended image along with the third image,
wherein the first target includes at least one of a current appearance of the user, the list of clothes, a list of recommendations, and a previous image corresponding to a current season or weather information.

18. An image processing apparatus using a smart glass, the apparatus comprising:
an extractor to extract a first target to be observed by a user from a first image received from the smart glass and generate a second image using the extracted first target;
an information collector to collect information related to the first target; and
an image generator to generate a third image using at least one of the second image and the information related to the first target, based on user settings in relation to the first target,
wherein, when the apparatus provides a virtual coexistence remote tour service to enable an image captured using the smart glass in a second place to be viewed identically in a first place and to provide the user in the first place with an effect similar to being in the second place, the first image refers to an image captured from a viewpoint corresponding to a gaze of the user with respect to the second place and the first target includes a predetermined scene or a landscape of the second place, and
wherein, for an augmented reality sharing function between user smart glasses of the first place and the second place, the third image represents a facial expression or a motion using a character for each user, or provides additional information including a speech bubble and a navigation map using a graphic.

19. An image processing method using a smart glass, the method comprising:
receiving a first image from the smart glass, and extracting a first target to be observed by a user from the first image;
generating a second image using the extracted first image;
collecting information related to the first target; and
generating a third image using at least one of the second image and the information related to the first target, based on user settings in relation to the first target,
wherein, when the method provides a virtual coexistence remote tour service, the method further comprises:
enabling an image captured using the smart glass in a second place to be viewed identically in a first place; and
providing the user in the first place with an effect similar to being in the second place,
wherein the first image refers to an image captured from a viewpoint corresponding to a gaze of the user with respect to the second place and the first target includes a predetermined scene or a landscape of the second place, and
wherein, for an augmented reality sharing function between user smart glasses of the first place and the second place, the third image represents a facial expression or a motion using a character for each user, or provides additional information including a speech bubble and a navigation map using a graphic.

* * * * *